United States Patent [19]

Vayrynen

[11] Patent Number: 6,154,457
[45] Date of Patent: *Nov. 28, 2000

[54] MOBILE STATION HAVING IMPROVED DCCH SYNCHRONIZATION

[75] Inventor: Mika J Vayrynen, Oulu, Finland

[73] Assignee: Nokia Mobile Phones Limited, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/870,808

[22] Filed: Jun. 6, 1997

[51] Int. Cl.[7] ............................................ H04J 3/06
[52] U.S. Cl. ........................ 370/350; 370/343; 370/324
[58] Field of Search ................................. 370/321, 322, 370/324, 350, 509, 510, 511, 337, 341, 347, 343; 455/434, 435

[56] References Cited

U.S. PATENT DOCUMENTS

| | | | |
|---|---|---|---|
| 5,199,031 | 3/1993 | Dahlin | 370/329 |
| 5,680,421 | 10/1997 | Shiino | 370/350 |
| 5,726,981 | 3/1998 | Ylitervo | 370/332 |
| 5,819,174 | 10/1998 | Kyllonen | 455/414 |
| 5,838,672 | 11/1998 | Ranta | 370/335 |
| 5,883,929 | 3/1999 | Wang | 370/509 |

*Primary Examiner*—Douglas W. Olms
*Assistant Examiner*—Ricardo M. Pizarro
*Attorney, Agent, or Firm*—Ohlandt, Greeley, Ruggiero & Perle, L.L.P.

[57] ABSTRACT

A method is disclosed for operating a mobile station (10). The method includes a first step of receiving a forward channel from a base station (30), the forward channel being transmitted to contain repeating frames each comprising N time slots, individual ones of the time slots including a synchronization word. A second step of the method correlates an $i^{th}$ one of the N time slots using a first correlation sequence (SYNC 1) and a second correlation sequence (SYNC 4) to obtain a first correlation result and a second correlation result, respectively. A third step of the method declares the forward channel to be one of a half-rate channel or a full-rate channel based on the first and second correlation results. In an exemplary embodiment N is equal to six, and i is equal to four. In the exemplary embodiment the first N/2 of the time slots are transmitted to have a same sequence of N/2 synchronization words whether the channel is a half-rate channel or a full-rate channel. In this embodiment i is equal to (N/2)+1.

9 Claims, 5 Drawing Sheets

FIG. 1C
PRIOR ART

SYNCHRONIZATION SEQUENCES

THE SYNC WORDS ARE SPECIFIED BY THE FOLLOWING PHASE CHANGES IN RADIANS:

| | | | | | | | | | | | | | | | | |
|---|---|---|---|---|---|---|---|---|---|---|---|---|---|---|---|---|
| SYNC 1 | $-\frac{\pi}{4}$ | $-\frac{\pi}{4}$ | $-\frac{\pi}{4}$ | $\frac{\pi}{4}$ | $\frac{3\pi}{4}$ | $\frac{\pi}{4}$ | $-\frac{3\pi}{4}$ | $\frac{3\pi}{4}$ | $\frac{\pi}{4}$ | $\frac{\pi}{4}$ | $-\frac{\pi}{4}$ | $\frac{\pi}{4}$ | $\frac{\pi}{4}$ | $-\frac{\pi}{4}$ | $\frac{\pi}{4}$ | $\frac{\pi}{4}$ |
| SYNC 2 | $-\frac{\pi}{4}$ | $-\frac{\pi}{4}$ | $-\frac{\pi}{4}$ | $\frac{3\pi}{4}$ | $\frac{3\pi}{4}$ | $\frac{\pi}{4}$ | $\frac{3\pi}{4}$ | $\frac{3\pi}{4}$ | $-\frac{\pi}{4}$ | $\frac{\pi}{4}$ | $\frac{\pi}{4}$ | $-\frac{\pi}{4}$ | $\frac{\pi}{4}$ | $\frac{\pi}{4}$ | $-\frac{\pi}{4}$ | $-\frac{\pi}{4}$ |
| SYNC 3 | $-\frac{3\pi}{4}$ | $\frac{\pi}{4}$ | $\frac{3\pi}{4}$ | $-\frac{3\pi}{4}$ | $-\frac{3\pi}{4}$ | $-\frac{\pi}{4}$ | $\frac{\pi}{4}$ | $\frac{\pi}{4}$ | $\frac{\pi}{4}$ | $-\frac{\pi}{4}$ | $-\frac{3\pi}{4}$ | $\frac{\pi}{4}$ | $\frac{\pi}{4}$ | $-\frac{3\pi}{4}$ | $\frac{\pi}{4}$ | $\frac{\pi}{4}$ |
| SYNC 4 | $\frac{\pi}{4}$ | $-\frac{3\pi}{4}$ | $\frac{\pi}{4}$ | $-\frac{3\pi}{4}$ | $\frac{\pi}{4}$ | $-\frac{\pi}{4}$ | $\frac{\pi}{4}$ | $-\frac{\pi}{4}$ | $\frac{\pi}{4}$ | $-\frac{3\pi}{4}$ | $\frac{\pi}{4}$ | $-\frac{3\pi}{4}$ | $-\frac{3\pi}{4}$ | $-\frac{3\pi}{4}$ | $-\frac{3\pi}{4}$ | $\frac{\pi}{4}$ |
| SYNC 5 | $\frac{\pi}{4}$ | $\frac{3\pi}{4}$ | $-\frac{3\pi}{4}$ | $\frac{\pi}{4}$ | $-\frac{\pi}{4}$ | $-\frac{\pi}{4}$ | $-\frac{\pi}{4}$ | $-\frac{3\pi}{4}$ | $\frac{3\pi}{4}$ | $-\frac{\pi}{4}$ | $\frac{3\pi}{4}$ | $-\frac{3\pi}{4}$ | $\frac{\pi}{4}$ | $\frac{3\pi}{4}$ | $\frac{\pi}{4}$ | $\frac{3\pi}{4}$ |
| SYNC 6 | $-\frac{3\pi}{4}$ | $\frac{3\pi}{4}$ | $\frac{3\pi}{4}$ | $-\frac{3\pi}{4}$ | $\frac{\pi}{4}$ | $-\frac{\pi}{4}$ | $\frac{\pi}{4}$ | $-\frac{\pi}{4}$ | $-\frac{3\pi}{4}$ | $-\frac{3\pi}{4}$ | $\frac{\pi}{4}$ | $-\frac{3\pi}{4}$ | $\frac{\pi}{4}$ | $-\frac{3\pi}{4}$ | $\frac{3\pi}{4}$ | $\frac{3\pi}{4}$ |

MOBILE STATION HAVING IMPROVED DCCH SYNCHRONIZATION

FIELD OF THE INVENTION

This invention relates generally to radiotelephones and, in particular, to radiotelephones or mobile stations such as those capable of operation with a cellular network.

BACKGROUND OF THE INVENTION:

FIGS. 1A–1D depict the frame, slot, and slot synchronization (SYNC) word sequences and SYNC word usages, respectively, for an exemplary prior art digital Time Division Multiple Access (TDMA) cellular air interface known in the art as IS-136 (see, for example, IS-136.1, Rev. A, Mar. 21, 1996 and IS-136.2, Rev. A, Feb. 12, 1996).

FIG. 1A shows that a 40 millisecond frame consists of six time slots. Slots 1–3 and 4–6 each comprise one TDMA Block. In the forward direction from a base station to a mobile station, which is a case of most interest to this invention, the frames are continuously transmitted. A given mobile station is assigned to receive in one slot per frame for a half data rate case, and is assigned to receive in two time slots for a full data rate case. FIG. 1B illustrates the format of one slot in the direction from the base station to the mobile station. The base station forms a part of a Base Station/Mobile Switching Center/Interworking function (BMI).

In particular, FIG. 1B illustrates one time slot of a Digital Control Channel (DCCH) that is transmitted by the BMI on a forward channel. The 28 bit (14 symbol) SYNC word/time slot identifier field occupies the first 28 bits of the frame, and is followed by various other fields, including a first Shared Channel Feedback (SCF) field, a first part of a DATA field, a Coded Superframe Phase (CSFP) field, a second part of the DATA field, a second SCF field, and a Reserved (RSVD) field of two bits. Of most interest to this invention is the SYNC word field.

The SYNC word/time slot identifier field is used for slot synchronization, equalizer training, and time slot identification. The six unique synchronization sequences shown in FIG. 1C are defined so as to have good autocorrelation properties to facilitate synchronization and training. Six time slot identifiers are defined, which have good cross correlation properties. Line 8 of FIG. 1D identifies the SYNC words for a channel fully assigned to full-rate users (i.e., three full-rate users per frame). Line 1 of FIG. 1D identifies the SYNC words for a channel fully assigned to half-rate users (i.e., six half-rate users per frame). Lines 2 through 7 identify the SYNC word order for a mixture of full-rate and half-rate users, such that only one SYNC word is assigned per user. Unassigned slots are indicated by the base station as half-rate user slots in the time slot identifier field. The mobile station uses its assigned SYNC word when transmitting on a Reverse Digital Traffic Channel (RDTC).

When a mobile station first comes to a digital channel it locates and then synchronizes to a DCCH. From the DCCH the mobile station is able to determine various access and other network parameters. However, when first attempting to synchronize to the DCCH the mobile station has no information as to whether the particular channel is a half-rate channel or a full-rate channel. That is, although the mobile station may make an automatic slot assignment of the DCCH (as in, by example, reselection), or it can be ordered to a slot by the base station, the slot rate (half or full) is not known. This presents a problem in selecting the correct synchronization sequences in the mobile station for correlation purposes, since in the fully assigned full-rate case only the first three synchronization sequences of FIG. 1C are used, while for the fully assigned half-rate case all six synchronization sequences are used. This problem can result in significant additional time being required to synchronize to the DCCH, which may be objectionable to some users.

OBJECTS OF THE INVENTION

It is thus a first object of this invention to provide an improved method for synchronizing a mobile station to a forward channel of a digital communications system.

It is a further object of this invention to provide a method of operating a mobile station so as to identify whether a particular forward channel is a half-rate channel or a full-rate channel.

SUMMARY OF THE INVENTION

The foregoing and other problems are overcome and the objects of the invention are realized by methods and apparatus in accordance with embodiments of this invention.

A method is disclosed for operating a mobile station, the method including a first step of receiving a forward channel from a base station, the forward channel being transmitted to contain repeating frames each comprising N time slots, individual ones of the time slots including a synchronization word. A second step of the method correlates an $i^{th}$ one of the N time slots using a first correlation sequence and a second correlation sequence to obtain a first correlation result and a second correlation result, respectively. A third step of the method declares the forward channel to be one of a half-rate channel or a full-rate channel based on the first and second correlation results.

In an exemplary embodiment N is equal to six, and i is equal to four.

In the exemplary embodiment the first N/2 of the time slots are transmitted to have a same sequence of N/2 synchronization words whether the channel is a half-rate channel or a full-rate channel. In this embodiment i is equal to (N/2)+1.

BRIEF DESCRIPTION OF THE DRAWINGS

The above set forth and other features of the invention are made more apparent in the ensuing Detailed Description of the Invention when read in conjunction with the attached Drawings, wherein:

FIGS. 1A–1D depict a frame, slot, and slot synchronization (SYNC) word sequences and SYNC word usages, respectively, for an exemplary prior art digital Time Division Multiple Access (TDMA) cellular air interface that is suitable for practicing this invention;

DETAILED DESCRIPTION OF THE INVENTION

Figure 2:
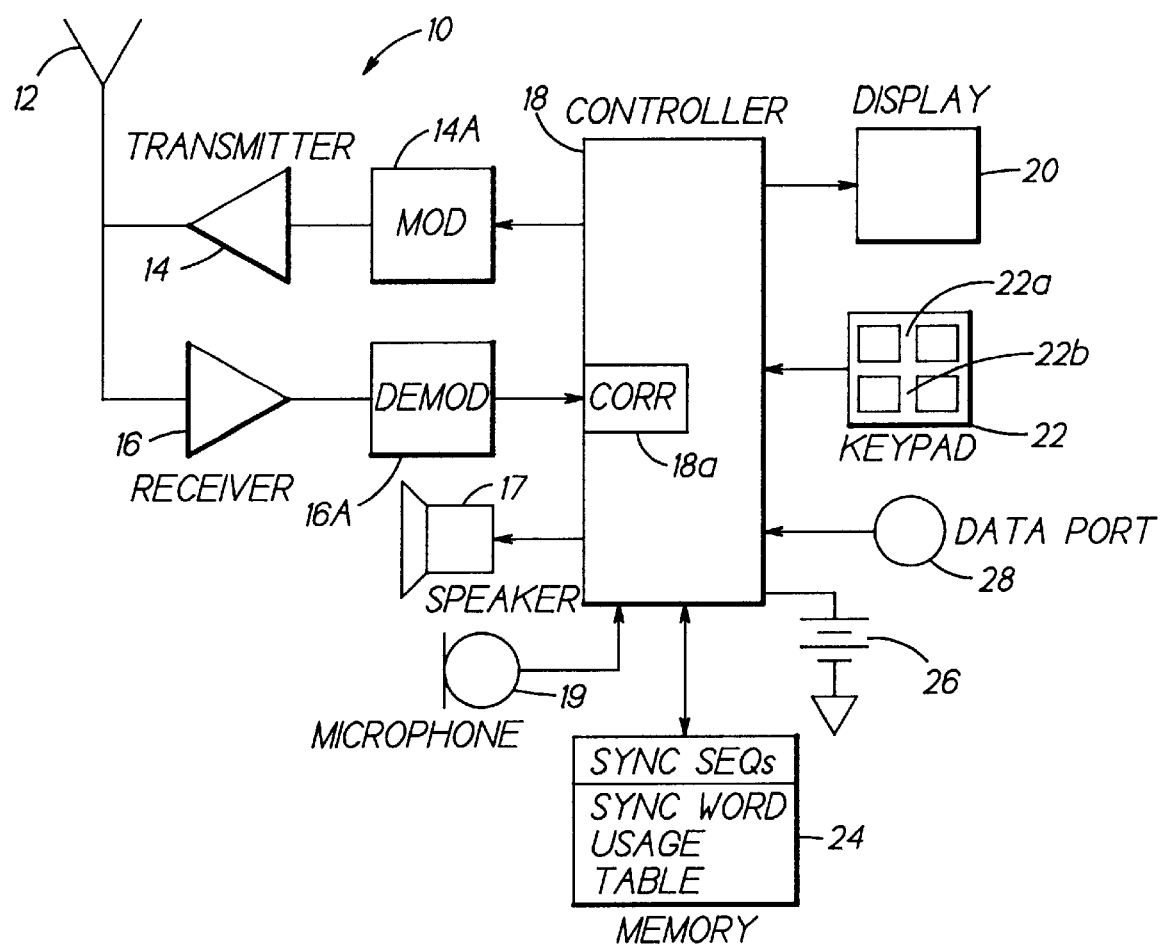
FIG. 2 is a block diagram of a mobile station that is constructed and operated in accordance with this invention.
Figure 3:
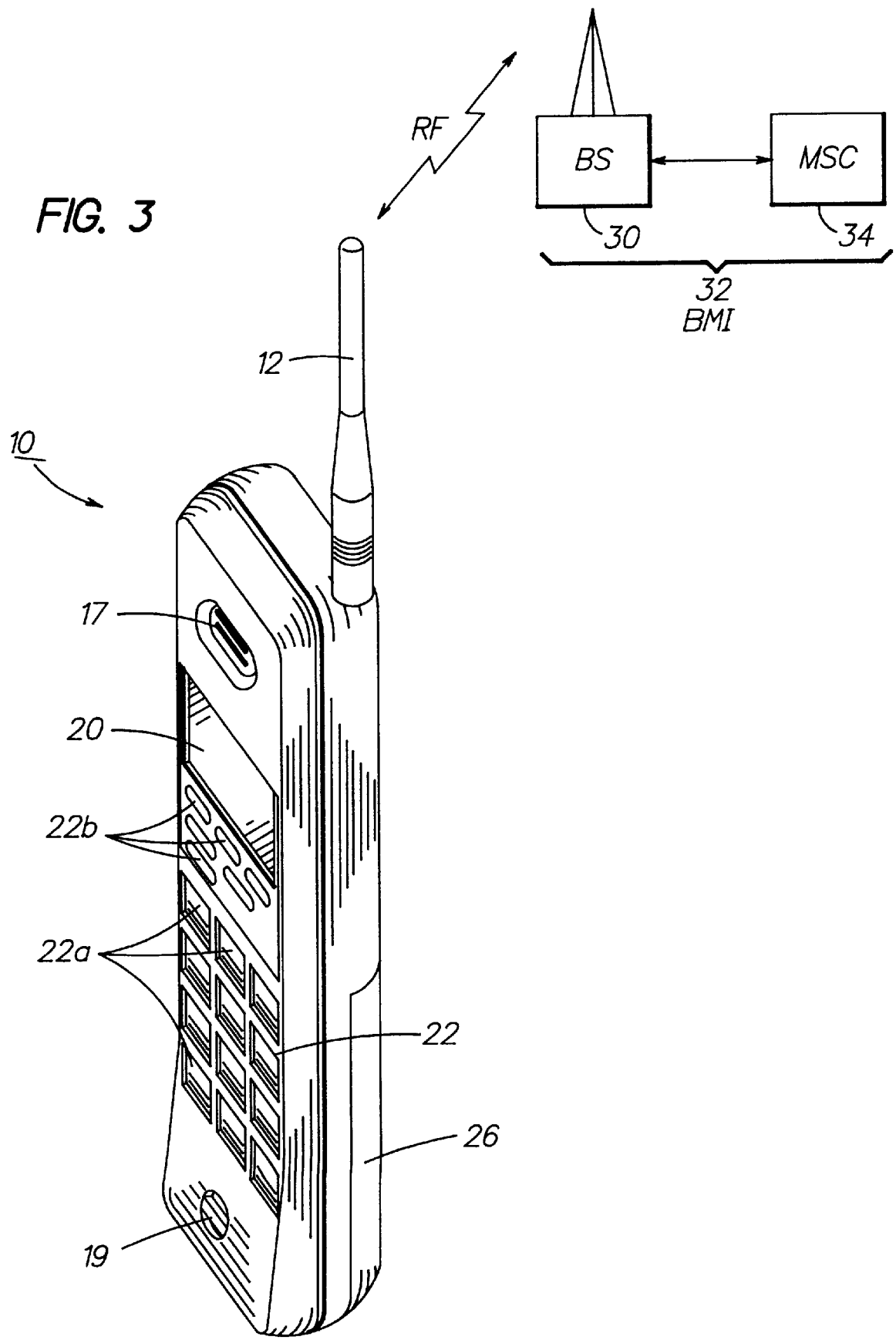
FIG. 3 is an elevational view of the mobile station shown in FIG. 2, and which further illustrates a cellular communication system to which the mobile station is bidirectionally coupled through wireless RF links.

Reference is made to FIGS. 2 and 3 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising the Base Station/Mobile Switching Center/Interworking function (BMI) 32, which further includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame and slot structure and SYNC word sequences of a type that was described above, although the teaching of this invention is not intended to be limited only to this specific structure, or for use only with an IS-136 compatible mobile station, or for use only in TDMA type systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with other standards besides IS-136 that use a similar slot identification technique. Dual or higher mode phones (e.g., TDMA/analog or TDMA/CDMA/analog) can also benefit from the teaching of this invention. It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the method described below in relation to FIG. 4.

The memory 24 also stores a representation of the synchronizing sequences (SYNC SEQs) 1–6, as shown in FIG. 1C, which are used by a correlator (CORR) 18a for correlating with received SYNCH sequences. Suitable, but not limiting, embodiments of the correlator 18a are described in commonly assigned U.S. Pat. No. 5,408,504, "Symbol and Frame Synchronization in a TDMA System", to Kjell Ostman, and in commonly assigned U.S. Pat. No. 5,590,160, "Symbol and Frame Synchronization in both a TDMA System and a CDMA System", also to Kjell Ostman. The disclosures of these two commonly assigned U.S. patents are incorporated by reference herein in their entireties for teaching suitable, but not limiting, embodiments of the correlator 18a. The memory 24 also stores a SYNC Word Usage Table, which is employed by the method as described below.

Figure 4:
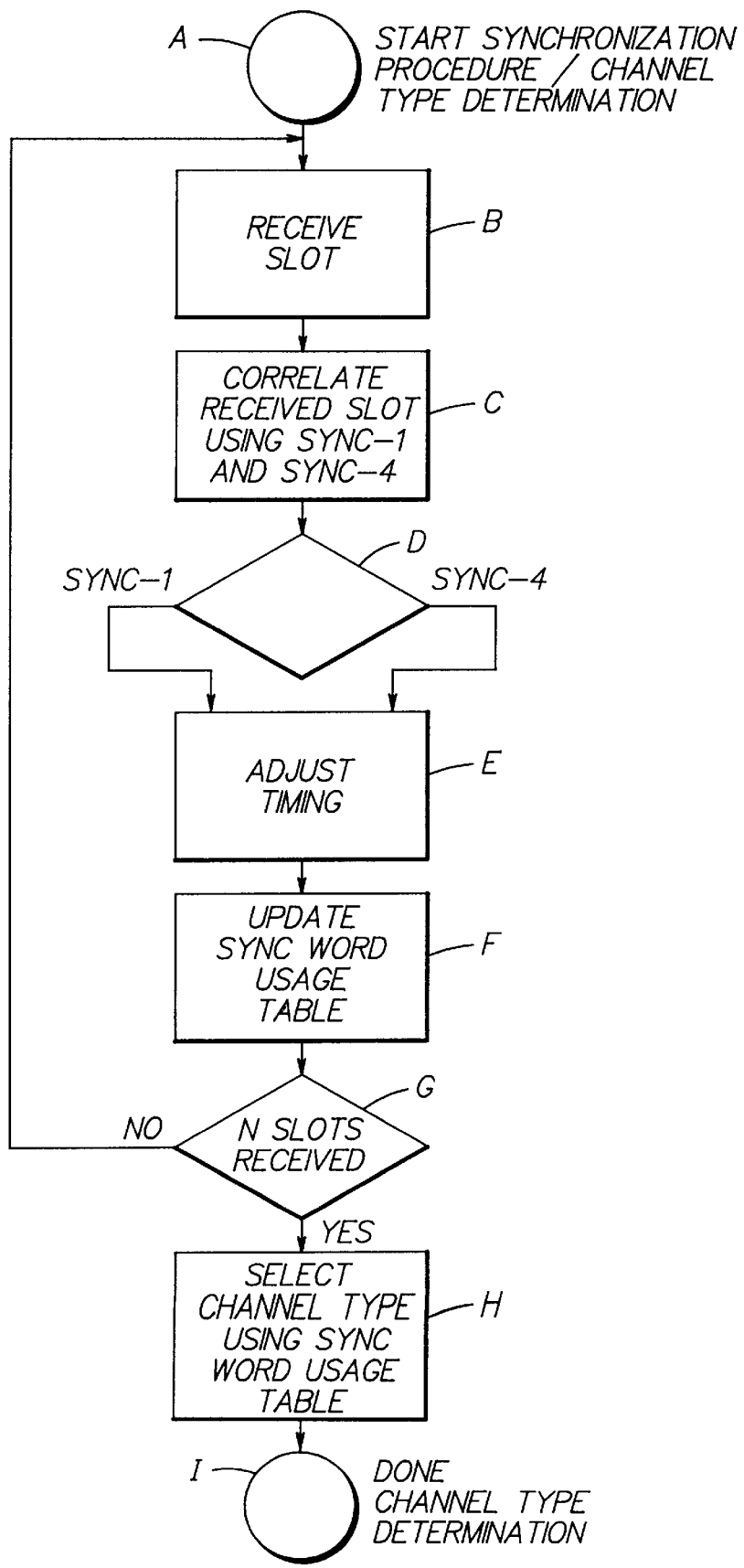
FIG. 4 is a logic flow diagram that illustrates a method in accordance with this invention.

Reference is now made to FIG. 4 for showing a synchronization/channel type determination method in accordance with this invention.

At Block A the controller 18 of the mobile station 10 enters the synchronization/channel type determination method. It is assumed that the controller 18 has previously tuned the receiver 16 to a forward digital channel, is receiving and demodulating to baseband the received symbols, and has performed an overall frame synchronization procedure. At this point the mobile station does not know whether a particular slot is the first slot or the fourth slot of the frame (i.e., whether the channel is a full rate channel or a half rate channel). The mobile station 10 is assumed to have a slot assignment. As presently specified, the half rate channel on the DCCH can be used only in slot 1.

Figures 1A, 1B, 1D:
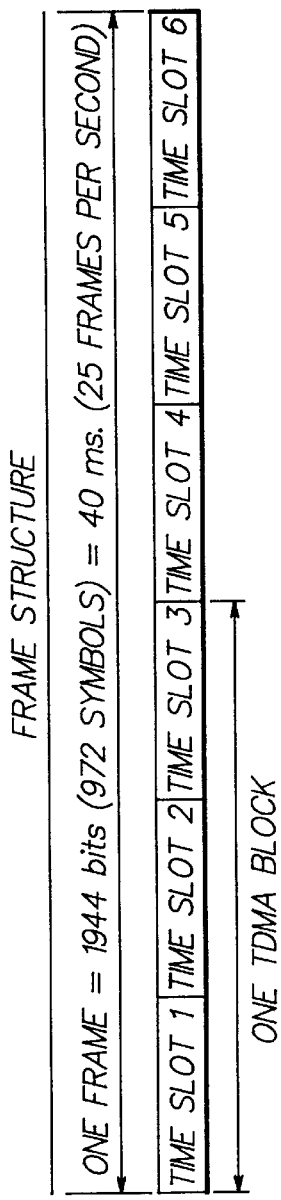

At Block B the mobile station receives a slot, and at Block C the correlator 18a correlates the received slot using both the SYNC sequences 1 and 4 that are stored in the memory 24. Referring to FIG. 1D, it can be seen that the first three slots use the same SYNC sequences (i.e., SYNC 1–3) regardless of whether the channel is operating at half-rate or full rate. At Block D the mobile station 10 makes a determination as to whether the SYNC-1 or the SYNC-4 correlation provided the highest amplitude correlation peak. Based on this determination the mobile station 10 optionally adjusts the receiver sampling timing accordingly at Block E, as the correlation result is an indication of whether the sampling instant of each data symbol is optimum (i.e., an optimum sampling time is indicated by a correlation peak). At Block F the mobile station 10 updates the SYNC Word Usage Table in the memory 24 to indicate whether SYNC-1 or SYNC-4 provided the highest amplitude correlation result.

At Block G a determination is made as to whether N slots (either slot 1 or slot 4) have been received and correlated. In a presently preferred embodiment of this invention N has a value in the range of 10 to 20, and provides a sufficient filtering of received slots. If the number of received and correlated slots is less than N, control returns to Block B to receive a next slot, else control passes to Block H. At Block H the SYNC Word Usage Table is examined to determine if only SYNC-1s were detected at Block D, or whether both SYNC-1s and SYNC-4s were detected Block D. For the former case the channel is assumed to be a half data rate channel, while for the latter case the channel is assumed to be a full data rate channel. Suitable threshold values are used in making this determination in order to eliminate the effects of fading and other radio path impairments that might give erroneous results. By example, and assuming that N=20, if 19 SYNC-1s were detected and one SYNC-4, the detection of the single SYNC-4 may be assumed to be caused by noise or fading and can be ignored. Likewise, if 8 SYNC-1s are detected and 12 SYNC-4s, the channel might still be assumed to be a full rate channel. In any case, the channel type is selected to be half rate or full rate, and the method then terminates at Block I.

Using this method the mobile station 10 is able to quickly and reliably determine if the forward channel is using the full-rate or half-rate option. Having made this determination, the mobile station 10 is then able to choose the correct SYNC sequences for the correlation calculations, and can thus more quickly synchronize to the forward channel, which is the desired result.

Although described in the context of preferred embodiments, it should be realized that a number of modifications to these teachings may occur to one skilled in the art. By example, certain steps in the method shown in FIG. 4 could be executed in other than the order shown (e.g., Blocks E and F could be executed in reverse order).

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station, comprising the steps of:

receiving a forward channel from a base station, the forward channel being transmitted to contain repeating frames each comprising N time slots, individual ones of the time slots including a synchronization word;

correlating a single $i^{th}$ one of the N time slots using a first correlation sequence and a second correlation sequence to obtain a first correlation result and a second correlation result, respectively, the first correlation sequence being one that is known to be transmitted in the $i^{th}$ one of the time slots when operating as a half-rate channel, and the second correlation sequence being one that is known to be transmitted in the $i^{th}$ one of the time slots when operating as a full-rate channel; and declaring the forward channel to be one of a half-rate channel or a full-rate channel based on the first and second correlation results that are obtained from the single $i^{th}$ one of the N time slots.

2. A method as in claim 1, wherein N is equal to six, and wherein i is equal to four.

3. A method for operating a mobile station, comprising the steps of:

receiving a forward channel from a base station, the forward channel being transmitted to contain repeating frames each comprising N time slots, individual ones of the time slots including a synchronization word;

correlating an $i^{th}$ one of the N time slots using a first correlation sequence and a second correlation sequence to obtain a first correlation result and a second correlation result, respectively; and declaring the forward channel to be one of a half-rate channel or a full-rate channel based on the first and second correlation results, wherein a first N/2 of the time slots are transmitted to have a same sequence of N/2 synchronization words whether the channel is a half-rate channel or a full-rate channel, and wherein i is equal to (N/2)+1.

4. A mobile station, comprising:

a receiver and demodulator for receiving and demodulating a forward channel from a base station, the forward channel being transmitted to contain repeating frames each comprising N time slots, individual ones of the time slots including a synchronization word;

a memory storing a plurality of predetermined synchronization sequences;

a correlator for correlating a single $i^{th}$ one of the N time slots output from the demodulator using a first correlation sequence and a second correlation sequence stored in the memory to obtain a first correlation result and a second correlation result, respectively, the first correlation sequence being one that is known to be transmitted in the $i^{th}$ one of the time slots when operating as a half-rate channel, and the second correlation sequence being one that is known to be transmitted in the $i^{th}$ one of the time slots when operating as a full-rate channel; and a controller coupled to the correlator for declaring the forward channel to be one of a half-rate channel or a full-rate channel based on the first and second correlation results that are obtained from the single $i^{th}$ one of the N time slots.

5. A mobile station as in claim 4, wherein N is equal to six, and wherein i is equal to four.

6. A mobile station, comprising:

a receiver and demodulator for receiving and demodulating a forward channel from a base station, the forward channel being transmitted to contain repeating frames each comprising N time slots, individual ones of the time slots including a synchronization word;

a memory storing a plurality of predetermined synchronization sequences;

a correlator for correlating an $i^{th}$ one of the N time slots output from the demodulator using a first correlation sequence and a second correlation sequence stored in the memory to obtain a first correlation result and a second correlation result, respectively; and a controller coupled to the correlator for declaring the forward channel to be one of a half-rate channel or a full-rate channel based on the first and second correlation results, wherein a first N/2 of the time slots are transmitted to have a same sequence of N/2 synchronization words whether the channel is a half-rate channel or a full-rate channel, and wherein i is equal to (N/2)+1.

7. A method for operating a mobile station, comprising the steps of:

receiving a forward channel from a base station, the forward channel being a digital control channel (DCCH) that is transmitted to contain repeating frames each comprising N time slots, individual ones of the time slots including one of N predetermined synchronization words;

correlating a single $i^{th}$ one of the N time slots using a first correlation sequence and a second correlation sequence to obtain a first correlation peak and a second correlation peak, respectively, the first correlation sequence being one that is known to be transmitted in the $i^{th}$ one of the time slots when operating as a half-rate DCCH, an d the second correlation sequence being one that is known to be transmitted in the $i^{th}$ one of the time slots when operating as a full-rate DCCH;

comparing magnitudes of the first and second correlation peaks to at least one threshold value, the first and second correlation peaks being those that are obtained from the single $i^{th}$ one of the N time slots; and declaring the DCCH to be one of a half-rate DCCH or a full-rate DCCH based on the result of the step of comparing.

8. A method as in claim 7, wherein N is equal to six, and wherein i is equal to four.

9. A method for operating a mobile station, comprising the steps of:

receiving a forward channel from a base station, the forward channel being a digital control channel (DCCH) that is transmitted to contain repeating frames each comprising N time slots, individual ones of the time slots including one of N predetermined synchronization words;

correlating an $i^{th}$ one of the N time slots using a first correlation sequence and a second correlation sequence to obtain a first correlation peak and a second correlation peak, respectively;

comparing magnitudes of the first and second correlation peaks to at least one threshold value; and declaring the DCCH to be one of a half-rate DCCH or a full-rate DCCH based on the result of the step of comparing, wherein a first N/2 of the time slots are transmitted to have a same sequence of N/2 synchronization words whether the channel is a half-rate channel or a full-rate channel, and wherein i is equal to (N/2)+1.

* * * * *